US011905376B2

(12) United States Patent
Knott et al.

(10) Patent No.: US 11,905,376 B2
(45) Date of Patent: Feb. 20, 2024

(54) SIOC-BONDED, LINEAR POLYDIMETHYLSILOXANE-POLYOXY-ALKYLENE BLOCK COPOLYMERS

(71) Applicant: Evonik Operations GmbH, Essen (DE)

(72) Inventors: Wilfried Knott, Essen (DE); Horst Dudzik, Essen (DE); Dagmar Windbiel, Essen (DE)

(73) Assignee: Evonik Operations GmbH, Essen (DE)

( * ) Notice: Subject to any disclaimer, the term of this patent is extended or adjusted under 35 U.S.C. 154(b) by 172 days.

(21) Appl. No.: 17/147,592

(22) Filed: Jan. 13, 2021

(65) Prior Publication Data

US 2021/0130551 A1 May 6, 2021

Related U.S. Application Data

(63) Continuation of application No. 16/456,101, filed on Jun. 28, 2019, now Pat. No. 10,954,344.

(30) Foreign Application Priority Data

Aug. 15, 2018 (EP) .................. 18189072

(51) Int. Cl.
*C08G 18/61* (2006.01)
*C08G 77/46* (2006.01)
*C08G 77/00* (2006.01)

(52) U.S. Cl.
CPC .......... *C08G 77/46* (2013.01); *C08G 18/61* (2013.01); *C08G 77/70* (2013.01)

(58) Field of Classification Search
None
See application file for complete search history.

(56) References Cited

U.S. PATENT DOCUMENTS

| | | | |
|---|---|---|---|
| 2,910,496 A | 10/1959 | Bailey et al. | |
| 3,083,254 A | 3/1963 | Slautterback | |
| 3,183,254 A * | 5/1965 | Rossmy | C07F 7/0896 252/573 |
| 3,346,610 A | 10/1967 | Omietanski et al. | |
| 3,356,758 A | 12/1967 | Omietanski et al. | |
| 3,384,599 A | 5/1968 | Omietanski et al. | |
| 3,480,583 A | 11/1969 | Bailey et al. | |
| 3,594,334 A | 7/1971 | Marlin | |
| 3,836,560 A | 9/1974 | Prokai et al. | |
| 3,920,587 A | 11/1975 | Watkinson | |
| 3,947,386 A | 3/1976 | Prokai et al. | |
| 4,066,680 A | 1/1978 | Lewis et al. | |
| 4,079,098 A | 3/1978 | Rossmy | |
| 4,110,503 A | 8/1978 | Ogawa et al. | |
| 4,177,201 A | 12/1979 | De Montigny et al. | |
| 4,238,402 A | 12/1980 | Clayton et al. | |
| 4,260,715 A | 4/1981 | De Montigny et al. | |
| 4,355,171 A | 10/1982 | De Montigny et al. | |
| 5,093,101 A | 3/1992 | Knott et al. | |
| 5,198,207 A | 3/1993 | Knott et al. | |
| 5,221,499 A | 6/1993 | Klein et al. | |
| 5,371,161 A | 12/1994 | Knott | |
| 5,430,166 A | 7/1995 | Klein et al. | |
| 5,430,167 A | 7/1995 | Klein et al. | |
| 5,455,367 A | 10/1995 | Klein et al. | |
| 5,475,127 A | 12/1995 | Klein et al. | |
| 5,565,183 A | 10/1996 | Knott | |
| 5,670,129 A | 9/1997 | Klapdor et al. | |
| 5,831,103 A | 11/1998 | Knott | |
| 5,856,548 A | 1/1999 | Droese et al. | |
| 5,934,579 A | 8/1999 | Hiersche et al. | |
| 5,951,739 A | 9/1999 | Klapdor et al. | |
| 5,972,285 A | 10/1999 | Knott | |
| 5,981,812 A | 11/1999 | Eufinger et al. | |
| 6,197,089 B1 | 3/2001 | Frommeyer et al. | |
| 6,255,511 B1 | 7/2001 | Klein et al. | |
| 6,291,622 B1 | 9/2001 | Droese et al. | |
| 6,307,082 B1 | 10/2001 | Klein et al. | |
| 6,387,154 B1 | 5/2002 | Frommeyer et al. | |
| 6,444,007 B1 | 9/2002 | Knott et al. | |
| 6,489,498 B2 | 12/2002 | Klein et al. | |
| 6,521,771 B2 | 2/2003 | Frommeyer et al. | |
| 6,659,162 B2 | 12/2003 | Frommeyer et al. | |
| 6,854,506 B2 | 2/2005 | Knott et al. | |
| 6,858,663 B2 | 2/2005 | Knott et al. | |

(Continued)

FOREIGN PATENT DOCUMENTS

| | | |
|---|---|---|
| CA | 2150841 C | 4/1999 |
| DE | OS 1545110 A1 | 6/1969 |

(Continued)

OTHER PUBLICATIONS

Machine translation of PL-121338, translation generated Oct. 2022, 5 pages. (Year: 2022).*
Yashiro et al. "Polymerization of Cyclosiloxanes by Means of Triflic Acid and Metal Triflates" Macromol. Chem. Phys. 2010, 211, 1311-1321. (Year: 2010).*
Knott et al., U.S. Appl. No. 17/145,558, filed Jan. 11, 2021.
Knott et al., U.S. Appl. No. 17/297,372, filed May 26, 2021.
Knott et al., U.S. Appl. No. 17/476,417, filed Sep. 15, 2021.
Modro et al., U.S. Appl. No. 17/367,456, filed Jul. 5, 2021.
Glos et al., U.S. Appl. No. 17/414,678, filed Jun. 16, 2021.
Glos et al., U.S. Appl. No. 17/414,726, filed Jun. 16, 2021.

(Continued)

*Primary Examiner* — Robert S Loewe

(74) *Attorney, Agent, or Firm* — Grüneberg and Myers PLLC

(57) ABSTRACT

The production of SiOC-bonded, linear polydimethylsiloxane-polyoxyalkylene block copolymers comprising repeating (AB) units by reaction of polyether diols with trifluoromethanesulfonic acid-acidified, equilibrated α,ω-diacetoxypolydimethylsiloxanes is described, wherein the reaction is undertaken by adding a solid, liquid or gaseous base, optionally using inert solvents.

21 Claims, No Drawings

(56) References Cited

U.S. PATENT DOCUMENTS

| | | | |
|---|---|---|---|
| 6,874,562 B2 | 4/2005 | Knott et al. |
| 6,915,834 B2 | 7/2005 | Knott et al. |
| 6,942,716 B2 | 9/2005 | Knott et al. |
| 7,018,458 B2 | 3/2006 | Knott et al. |
| 7,125,585 B2 | 10/2006 | Dudzik et al. |
| 7,157,541 B2 | 1/2007 | Knott et al. |
| 7,196,153 B2 | 3/2007 | Burkhart et al. |
| 7,598,334 B2 | 10/2009 | Ferenz et al. |
| 7,612,158 B2 | 11/2009 | Burkhart et al. |
| 7,612,159 B2 | 11/2009 | Burkhart et al. |
| 7,619,035 B2 | 11/2009 | Henning et al. |
| 7,645,848 B2 | 1/2010 | Knott et al. |
| 7,754,778 B2 | 7/2010 | Knott et al. |
| 7,825,205 B2 | 11/2010 | Knott et al. |
| 7,825,206 B2 | 11/2010 | Neumann et al. |
| 7,825,209 B2 | 11/2010 | Knott et al. |
| 8,138,294 B2 | 3/2012 | Henning et al. |
| 8,247,525 B2 | 8/2012 | Schubert et al. |
| 8,268,939 B2 | 9/2012 | Ebbrecht et al. |
| 8,283,422 B2 | 10/2012 | Schubert et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,349,907 B2 | 1/2013 | Henning et al. |
| 8,420,748 B2 | 4/2013 | Henning et al. |
| 8,450,514 B2 | 5/2013 | Schubert et al. |
| 8,455,603 B2 | 6/2013 | Ferenz et al. |
| 8,476,330 B2 | 7/2013 | Dimitroff |
| 8,598,295 B2 | 12/2013 | Henning et al. |
| 8,609,798 B2 | 12/2013 | Knott et al. |
| 8,623,984 B2 | 1/2014 | Henning et al. |
| 8,722,834 B2 | 5/2014 | Knott et al. |
| 8,772,423 B2 | 7/2014 | De Gans et al. |
| 8,779,079 B2 | 7/2014 | Henning et al. |
| 8,841,400 B2 | 9/2014 | Henning et al. |
| 8,921,437 B2 | 12/2014 | Knott et al. |
| 8,957,009 B2 | 2/2015 | Schubert et al. |
| 8,969,502 B2 | 3/2015 | Knott et al. |
| 8,974,627 B2 | 3/2015 | Schubert et al. |
| 8,993,706 B2 | 3/2015 | Schubert et al. |
| 9,315,614 B2 | 4/2016 | Schubert et al. |
| 9,441,145 B2 | 9/2016 | Schubert et al. |
| 9,695,202 B2 | 7/2017 | Henning et al. |
| 9,896,541 B2 | 2/2018 | Fiedel et al. |
| 9,975,909 B2 | 5/2018 | Schubert et al. |
| 10,087,278 B2 | 10/2018 | Lobert et al. |
| 10,099,211 B2 | 10/2018 | Knott et al. |
| 10,106,649 B2 | 10/2018 | Fiedel et al. |
| 10,414,872 B2 | 9/2019 | Knott et al. |
| 10,544,267 B2 | 1/2020 | Knott et al. |
| 10,787,414 B2 | 9/2020 | Fiedel et al. |
| 10,793,662 B2 | 10/2020 | Günther et al. |
| 10,836,867 B2 | 11/2020 | Knott |
| 10,954,344 B2 | 3/2021 | Knott et al. |
| 10,995,174 B2 | 5/2021 | Emmrich-Smolczyk et al. |
| 11,066,429 B2 | 7/2021 | Knott et al. |
| 2002/0161158 A1 | 10/2002 | Burkhart et al. |
| 2004/0186260 A1 | 9/2004 | Hohenberg et al. |
| 2007/0049717 A1 | 3/2007 | Knott et al. |
| 2007/0128143 A1 | 6/2007 | Guning et al. |
| 2009/0137752 A1 | 5/2009 | Knott et al. |
| 2010/0022435 A1 | 1/2010 | Henning et al. |
| 2010/0081781 A1 | 4/2010 | Schubert et al. |
| 2011/0230619 A1 | 9/2011 | Kuppert et al. |
| 2011/0301254 A1 | 12/2011 | Knott et al. |
| 2012/0010302 A1 | 1/2012 | Hartung et al. |
| 2012/0068110 A1 | 3/2012 | Schubert et al. |
| 2012/0097883 A1 | 4/2012 | Henning et al. |
| 2012/0282210 A1 | 11/2012 | Denning et al. |
| 2012/0296125 A1 | 11/2012 | Schubert et al. |
| 2013/0035408 A1 | 2/2013 | Knott et al. |
| 2013/0041115 A1 | 2/2013 | Knott et al. |
| 2013/0213267 A1 | 8/2013 | Fiedel et al. |
| 2013/0217907 A1 | 8/2013 | Henning et al. |
| 2013/0237616 A1 | 9/2013 | Ferenz et al. |
| 2013/0261201 A1 | 10/2013 | Knott et al. |
| 2013/0345318 A1 | 12/2013 | Schubert et al. |
| 2014/0256844 A1 | 9/2014 | Henning et al. |
| 2014/0309446 A1 | 10/2014 | Amajjahe et al. |
| 2015/0004112 A1 | 1/2015 | Ritter et al. |
| 2015/0004113 A1 | 1/2015 | Ritter et al. |
| 2015/0023900 A1 | 1/2015 | Knott et al. |
| 2015/0057369 A1 | 2/2015 | Ferenz et al. |
| 2015/0057412 A1 | 2/2015 | Knott et al. |
| 2016/0053051 A1 | 2/2016 | Schubert et al. |
| 2016/0130290 A1 | 5/2016 | Knott et al. |
| 2016/0130402 A1 | 5/2016 | Schubert et al. |
| 2016/0160009 A1 | 6/2016 | Ferenz et al. |
| 2017/0081469 A1 | 3/2017 | Fiedel et al. |
| 2017/0088667 A1 | 3/2017 | Fiedel et al. |
| 2017/0198099 A1 | 7/2017 | Knott |
| 2017/0226285 A1 | 8/2017 | Lobert et al. |
| 2018/0016392 A1 | 1/2018 | Lobert et al. |
| 2018/0134850 A1 | 5/2018 | Knott et al. |
| 2018/0208707 A1 | 7/2018 | Krebs et al. |
| 2018/0258228 A1 | 9/2018 | Amajjahe et al. |
| 2018/0305596 A1 | 10/2018 | Schubert et al. |
| 2018/0319823 A1 | 11/2018 | Knott et al. |
| 2018/0355114 A1 | 12/2018 | Knott et al. |
| 2018/0355115 A1 | 12/2018 | Knott et al. |
| 2019/0040205 A1 | 2/2019 | Knott |
| 2019/0048228 A1 | 2/2019 | Amajjahe et al. |
| 2019/0076552 A1 | 3/2019 | Li et al. |
| 2019/0100625 A1 | 4/2019 | Knott et al. |
| 2019/0106369 A1 | 4/2019 | Schubert et al. |
| 2019/0106441 A1 | 4/2019 | Knott et al. |
| 2020/0377526 A1 | 7/2020 | Knott et al. |
| 2020/0339612 A1 | 10/2020 | Knott et al. |
| 2020/0377524 A1 | 12/2020 | Knott et al. |
| 2020/0377525 A1 | 12/2020 | Knott et al. |
| 2020/0377660 A1 | 12/2020 | Knott et al. |
| 2020/0377665 A1 | 12/2020 | Knott et al. |
| 2020/0377666 A1 | 12/2020 | Knott et al. |
| 2020/0377684 A1 | 12/2020 | Hermann et al. |
| 2020/0377686 A1 | 12/2020 | Knott et al. |
| 2020/0385528 A1 | 12/2020 | Knott |
| 2021/0015269 A1 | 1/2021 | Terheiden et al. |
| 2021/0047474 A1 | 2/2021 | Klostermann et al. |
| 2021/0130551 A1 | 5/2021 | Knott et al. |
| 2021/0137276 A1 | 5/2021 | Landers et al. |
| 2021/0163687 A1 | 6/2021 | Knott et al. |
| 2021/0171719 A1 | 6/2021 | Knott et al. |
| 2021/0214488 A1 | 7/2021 | Emmrich-Smolczyk et al. |
| 2021/0253780 A1 | 8/2021 | Wessely et al. |
| 2021/0253799 A1 | 8/2021 | Knott et al. |
| 2021/0301099 A1 | 9/2021 | Knott et al. |
| 2021/0371598 A1 | 12/2021 | Knott et al. |
| 2022/0348721 A1 | 11/2022 | Knott et al. |

FOREIGN PATENT DOCUMENTS

| | | | |
|---|---|---|---|
| DE | 1545110 | 12/1976 | |
| DE | 103 12 636.8 A1 | 9/2004 | |
| DE | 10 2005 039 931.2 A1 | 3/2007 | |
| EP | 0 514 737 A1 | 11/1992 | |
| EP | 0 685 425 A1 | 12/1995 | |
| EP | 1 350 804 A1 | 10/2003 | |
| EP | 1 935 923 A2 | 6/2008 | |
| EP | 1935922 B1 | 5/2013 | |
| EP | 3492513 A1 | 6/2019 | |
| PL | 121338 | * 1/1984 | ................ C07F 7/18 |
| WO | 02/060621 A2 | 8/2002 | |
| WO | 2013/010747 A1 | 1/2013 | |
| WO | 2014/104388 A2 | 7/2014 | |
| WO | 2014/104390 A2 | 7/2014 | |
| WO | 2018/015152 A1 | 1/2018 | |
| WO | 2019/105608 A1 | 6/2019 | |

(56) References Cited

FOREIGN PATENT DOCUMENTS

WO     WO2019/219446 A1    11/2019
WO     WO2019/219452 A1    11/2019

OTHER PUBLICATIONS

Wagner et al., U.S. Appl. No. 17/391,664, filed Aug. 2, 2021.
Ferenz et al., U.S. Appl. No. 17/523,059, filed Nov. 10, 2021.
European Search Report dated Dec. 18, 20109 in EP 18189072.4 (6 pages).
Knott et al., U.S. Appl. No. 17/239,011, filed Apr. 23, 2021.
European Search Report dated Dec. 19, 2018, in European Application No. 18189072.4, 6 pages.
European Office Action dated Sep. 6, 2023, in European Application No. 18189072.4, 11 pages.
Knott et al., U.S. Appl. No. 16/315,833, filed Jan. 7, 2019.
J. Pola et al., "Mechanism of Reversible Cleavage of Acetoxysilanes to Siloxanes and Acetanhydride", Collection Czechoslov. Chem. Commun., vol. 39, No. 5, 1974, pp. 1169-1176.
S. N. Borisov et al., "Acetoxysiloxane Oligomers I. The interaction of Acetic Anhydride with Cyclic Dimethylsiloxanes", Journal of Organometallic Chemistry, vol. 11, 1968, pp. 27-33.
Dr. Walter Simmler, Houben-Weyl, "Methods of Organic Chemistry", vol. VI/2, 4th Edition, O-Metal Derivates of Organic Hydroxy Compounds, 1963, pp. 77-170, with partial English translation of pp. 162-164.

\* cited by examiner

SIOC-BONDED, LINEAR POLYDIMETHYLSILOXANE-POLYOXYALKYLENE BLOCK COPOLYMERS

This application is a continuation application of U.S. application Ser. No. 16/456,101 filed Jun. 28, 2019, currently pending, which claims the benefit of European Application No. EP 18189072.4 filed on Aug. 15, 2018, the disclosures of which are expressly incorporated herein by reference.

FIELD

The invention relates to a process for producing SiOC-bonded, linear polydimethylsiloxane-polyoxyalkylene block copolymers comprising repeating (AB) units.

BACKGROUND

In the production of flexible polyurethane foams the mixture of raw materials is admixed with polysiloxane-polyoxyalkylene block copolymers which have a very wide variety of uses and inter alia allow formation of a uniform pore structure and stabilize the resulting foam until termination of the reaction. However not all polysiloxane-polyoxyalkylene block copolymers are similarly suitable. In order to be usable as polyurethane foam stabilizers the polyoxyalkylene blocks and the polysiloxane block of the block copolymers must be present in a balanced ratio, the construction of the two blocks also being very important. For the construction of a foam stabilizer having the greatest possible effectiveness there are a great many variables both for the polyoxyalkylene block and for the polysiloxane block:

The polyoxyalkylene block may be composed of various oxyalkylene units, especially of oxyethylene, oxypropylene and oxybutylene units. The weight ratio of these units to one another, the sequence thereof and the molar weight of the polyoxyalkylene block may be varied. Also of importance is the end group of the polyoxyalkylene block which may be reactive (for example OH group) or inert (for example alkoxy group) in respect of polyurethane formation. The polyoxyalkylene block may be bonded to the polysiloxane block by a hydrolytically stable C—Si bond or the hydrolytically less stable C—O—Si bond. Different polyoxyalkylene blocks may also be bonded to the polysiloxane block.

The polysiloxane block may be varied in respect of the nature and proportion of the Si units. The siloxane block may be straight-chain or branched and may have differing molecular weights. The polyoxyalkylene blocks may be bonded to the polysiloxane block terminally and/or laterally.

Predictions about the effectiveness of a polysiloxane-polyoxyalkylene block copolymer as a foam stabilizer are possible only to a limited extent. Those skilled in the art are therefore compelled to investigate possible variations largely by empirical means. Given the large, virtually inestimable number of possible variations, finding specific structural parameters and corresponding block copolymers that are particularly effective in the context of polyurethane production poses a very great challenge.

Polysiloxane-polyoxyalkylene block copolymers having different polyoxyalkylene radicals in an average molecule have already been described repeatedly. From the large number of corresponding publications the following documents are cited as representative examples:

DE 10 2005 039 931.2 discloses a process for producing SiOC-bonded, linear polydimethylsiloxane-polyoxyalkylene block copolymers comprising repeating (AB) units. In this process a reaction matrix consisting of amino siloxane, polyoxyalkylene diol and solvent is at elevated temperatures admixed with a small amount of a tertiary amine such as for example from the group of the aromatic amines (pyridines, pyrimidines, pyridazine, pyrazine, quinoline, imidazole etc.) and/or from the group of the cycloaliphatic amine bases (quinuclidine, diazabicyclo[2,2,2]octane, etc.), in particular 1,8-diazabicyclo[5,4,0]-undec-7-ene, and the polycondensation reaction to liberate ammonia according to the general reaction

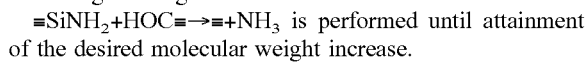

is performed until attainment of the desired molecular weight increase.

These compounds, the use thereof for producing polyurethane foams and a process for the production thereof has already been described in U.S. Pat. No. 3,836,560.

These polyether siloxanes are useful surface-active additives for producing polyurethane foams, their cell-opening effect being in demand in particular in ether foams or open-celled rigid foams. The disadvantage of their industrial synthesis is that both the production of the amine component fraught with salt generation (silazane precursor susceptible to hydrolysis) and the coupling process itself are complex and inconvenient and some of the compounds employed are problematic and difficult to handle in a production environment.

It is desirable to develop a simple, economically advantageous process by which (AB) block copolymers having improved properties may be produced.

DE 103 12 636.8 claims a process for reacting ≡Si(H) units containing branched polyorganosiloxanes with at least one alcohol, characterized in that it comprises partially or completely substituting hydrogen atoms present in the ≡Si (H) units of the polyorganosiloxane by alkoxide radicals of the employed alcohols in one process step using one or more element compounds of main group III and/or the 3rd transition group as catalyst.

Following the teaching of this reference it is also possible to produce partially substituted polyorganosiloxanes which comprise not only the substituted Si—O—C units but also as yet unconverted Si(H) units. To this end, the amount of substance ratio of SiH groups to alcohol groups is preferably established in the range from 1:0.1 to 1:0.99 mole equivalents.

Such a reaction in a substoichiometric ratio is said to retain a remainder of unconverted Si—H-function which may in a subsequent step be reacted, for example in a hydrosilylation reaction in which a silicon-carbon bond is formed, to produce mixed products.

EP1935922 B1 teaches a route to high molecular weight linear SiOC-bonded polydimethylsiloxane-polyoxyalkylene block copolymers comprising repeating (AB) units by reaction of polyether diols with a stoichiometric excess of α,ω-dihydrogenpolydimethylsiloxanes in the presence of one or more element compounds of main group III and/or the 3rd transition group as catalyst, wherein after complete conversion of the alcohol component the reaction is continued until Si(H) groups are no longer detectable by gas volumetric means. The gas volumetric SiH value determination is effected by alkoxide-induced decomposition of a sample according to established processes.

Irrespective of the attractiveness of this dehydrogenative process for SiOC bonding especially in relation to the avoidance of liquid and/or solid byproducts, both the use of costly and toxic catalysts such as for example tris(pentafluorophenyl)borane and the safe handling and disposal of the hydrogen gas formed in the synthesis represent disadvantages of this technology that need to be overcome.

The technical problem addressed by the present invention is accordingly that of providing a process for producing linear SiOC-bonded polydimethylsiloxane-polyoxyalkylene block copolymers, and very particularly also those of high molecular weight, which overcomes the difficulties discussed.

It has now been found that, surprisingly, linear SiOC-bonded polydimethylsiloxane-polyoxyalkylene block copolymers comprising repeating (AB) units, and very particularly also those of high molecular weight, are producible when end-equilibrated, linear, trifluoromethanesulfonic acid-acidified α,ω-acetoxy-bearing polydimethylsiloxanes are reacted with polyether diols.

Routes to acetoxy-functional siloxanes are described in the literature.

For instance the non-equilibrating opening of simple unbranched siloxane cycles with acetic anhydride to afford short-chain, chain-terminal, acetoxy-bearing siloxanes in the presence of catalysts is known from numerous publications and property right searches.

Borisov and Sviridova describe the opening of cyclic dimethylsiloxanes with acetic anhydride in the presence of catalytic amounts of iron(III) chloride to afford short-chain α,ω-acetoxysiloxanes (S. N. Borisov, N. G. Sviridova, J. Organomet. Chem. 11 (1968), 27-33). Lewis et al. are concerned in U.S. Pat. No. 4,066,680 with the production of short-chain α,ω-siloxanediols, wherein octamethylcyclotetrasiloxane is reacted with acetic anhydride over acid-treated fuller's earths and the thus-obtained mixtures of short-chain α,ω-acetoxysiloxanes are hydrolysed in alkalified water.

U.S. Pat. No. 3,346,610 likewise discloses a route to acetoxy-bearing, short-chain siloxanes based on metal-halide-induced acetoxy-modification of strained cyclic siloxanes by reacting said siloxanes with acetoxy-containing silicone compounds. A multiplicity of Friedel-Crafts-active metal halides act as a catalyst here, wherein zinc chloride is commended as preferred. A specific objective of U.S. Pat. No. 3,346,610 is the acetoxy-modification of strained diorganosiloxane cycles with deliberate avoidance of equilibration processes.

The prior art thus relates to endeavours which provide for the opening of cyclic siloxanes—sometimes strained cyclosiloxanes—with acyloxy-containing reactants and which have for their objective to obtain defined linear short-chain siloxane species still requiring separation by means of fractional distillation.

However, the pure-chain acetoxy-modified siloxane compounds of defined molar mass that have been synthesized by this route are unsuitable for the production of organomodified siloxanes, in particular polyether siloxanes, that are employed in demanding industrial applications, for example in PU foam stabilization or in the defoaming of fuels, etc. Active ingredients that effectively address such a field of use are always characterized by a broad oligomer distribution comprising high, medium and low molar masses, since the oligomers present therein, depending on their molar mass and hence their diffusion characteristics, can very commonly be imputed to have differentiated surfactant tasks in different time windows of the respective process.

SUMMARY

Acyloxyorganopolysiloxanes and in particular organosiloxanes having terminal acyloxy groups are likewise known as starting materials for subsequent reactions. Thus, for example the acyloxy groups in a diorganosiloxane may be hydrolysed, whereupon the hydrolysate may be dehydrated and the dehydrated hydrolysate polymerized to form flowable diorganopolysiloxane. These flowable polysiloxanes are suitable as starting materials for the production of viscous oils and rubbers which may be cured to afford silicone elastomers.

Organosiloxanes provided with terminal acyloxy groups may be obtained for example by reaction of an alkyl siloxane and an organic acid and/or the anhydride thereof in the presence of sulfuric acid as catalyst. Such a process is described in U.S. Pat. No. 2,910,496 (Bailey et al.). Although this process in principle also affords organosiloxanes having terminal acyloxy groups, the process has the disadvantage that the reaction product consists of a mixture of acyloxy-containing siloxanes and acyloxy-bearing silanes of varying composition. In particular, the teaching in this regard explains that alkyl siloxane copolymers composed of M, D and T units are cleaved by the process into trimethylacyloxysilane, diacyloxydimethylsiloxane and methyltriacyloxysilane. Thus, Bailey obtains in the reaction of octamethylcyclotetrasiloxane with acetic anhydride and acetic acid, after neutralization of the sulfuric acid used as catalyst, separation of the salts and removal of water, residual acetic acid and acetic anhydride, a complex substance mixture and certainly not an equilibrate which is then subjected to fractional distillation (see example, ibid.). The chemical identity of the thus obtained fractions II and IV remains unclear and it is therefore difficult in this way to obtain defined products or to separate these in high yields from the mixture.

DETAILED DESCRIPTION

Citing Bailey et al. (U.S. Pat. No. 2,910,496), DE-OS 1545110 (A1) (Omietanski et al.) teaches a process in which an acyloxy group of an acyloxysiloxane is reacted with the hydroxyl group of a polyoxyalkylenehydroxy polymer to afford a siloxane-oxyalkylene block copolymer and a carboxylic acid, wherein the carboxylic acid is removed from the reaction mixture. The solvent- and catalyst-free reactions described therein in some cases require considerable reaction times (up to 11.5 hours (example 1)), very high reaction temperatures which are harmful to the product (150° C. to 160° C. (example 1)) and application of an auxiliary vacuum/stripping of the reaction matrix with dry nitrogen over the entire reaction duration and despite the harsh reaction conditions do not always achieve complete conversion at the product stage (example 9, ibid.).

From a production engineering standpoint the combination of high reaction temperatures and long reaction times and also the unpredictable product quality are to the detriment of the process described by Omietanski et al.

It has now been found that trifluoromethanesulfonic acid-acidified equilibrated α,ω-diacetoxysiloxanes may be produced by the reaction of siloxane cycles ($D_4$ and/or $D_5$) with acetic anhydride in the presence of trifluoromethanesulfonic acid such as is disclosed in the teaching of the as yet unpublished European patent applications having the filing numbers EP18172882.5 and EP18172876.7. According to the teaching of these documents these diacetoxysiloxanes react swiftly and also completely with polyether (mono)ols at moderate temperatures to afford SiOC-bonded polyether siloxanes having the structure type ABA.

The inventors have now found that, surprisingly, trifluoromethanesulfonic acid-acidified equilibrated α,ω-diacetoxysiloxanes, and especially those described in EP18172882.5 and EP18172876.7, even have a sufficiently high reactivity to ensure that reaction thereof with α,ω-polyetherdiols affords the demanding high molecular weight SiOC-bonded A(BA)n structures.

The disclosure contents of EP18172882.5 and EP18172876.7 are accordingly fully incorporated into the inventive teaching contained herein. Trifluoromethanesulfonic acid-acidified equilibrated α,ω-diacetoxypolydimethylsiloxanes are obtainable when cyclic siloxanes, in particular comprising $D_4$ and/or $D_5$, are reacted with acetic anhydride using trifluoromethanesulfonic acid as catalyst. The trifluoromethanesulfonic acid is preferably employed in amounts of 0.1 to 0.3 percent by mass based on the reaction matrix consisting of acetic anhydride and cyclic siloxanes. The reaction is performed preferably at temperatures of 140° C. to 160° C. and preferably over a period of 4 to 8 hours.

According to the invention the trifluoromethanesulfonic acid-acidified, end-equilibrated α,ω-diacetoxypolydimethylsiloxanes are brought to reaction with polyether diol(s) by addition of a solid, liquid or gaseous base, optionally using inert solvents.

Preferred simple bases to be employed according to the invention are for example alkali metal and/or alkaline earth metal carbonates and/or hydrogencarbonates and/or gaseous ammonia and/or amines. Having regard to the known propensity for condensation of acetoxysiloxanes, very particular preference is given to bases which on account of their chemical composition do not introduce any water into the reaction system. Thus anhydrous carbonates are preferred over hydrogencarbonates and bases free from water of hydration are preferred over bases containing water of hydration.

Having regard to the poor solubility of the alkali metal/alkaline earth metal carbonates and/or hydrogencarbonates in the reaction system a preferred embodiment of the invention comprises choosing relatively high excesses thereof which preferably correspond to at least a 2000-fold stoichiometric equivalent of the trifluoromethanesulfonic acid present in the α,ω-diacetoxypolydimethylsiloxane.

According to the invention very particular preference is given to the use of gaseous ammonia as the base so that the acetic acid liberated during the reaction is bound as ammonium acetate.

In a preferred embodiment of the invention the amount of the solid, liquid or gaseous base introduced into the reaction system is measured such that it is sufficient not only for the neutralization of the trifluoromethanesulfonic acid present in the system but also for the salt precipitation of the acetate groups bonded to the siloxane and the precipitation of the acetic anhydride and any free acetic acid still present in the reaction system. In a preferred embodiment of the invention the reaction is performed at temperatures between 20° C. to 120° C., preferably between 20° C. and 70° C., over a duration of 1 to 10, preferably at least over the duration of 1 to 3, hours.

A preferred embodiment of the invention may comprise initially charging the trifluoromethanesulfonic acid-acidified, end-equilibrated α☐ω-diacetoxypolydimethylsiloxane with polyether diols at temperatures of <25° C. with stirring and then adding ammonia (example 2). This variant conducted using strong ammonia binds not only trifluoromethanesulfonic acid, acetic anhydride and any free acetic acid present in the reaction system but also binds the acetic acid liberated during the reaction as ammonium acetate. The reaction is preferably performed at temperatures between 20° C. and 70° C. over a duration of preferably 1 to 3 hours.

Of decisive importance for achieving a high molecular weight SiOC-bonded A(BA)n polyether siloxane structure is the quality of the employed trifluoromethanesulfonic acid-acidified α,ω-diacetoxypolydimethylsiloxane. It has been found by the inventors in the context of a broad investigation that, surprisingly, ensuring a perfect equilibration result in the α,ω-diacetoxypolydimethylsiloxane is essential for the construction of high molecular weight SiOC-bonded A(BA)n polyether siloxane structure. Accordingly, the term "end-equilibrated" is to be understood as meaning that the equilibrium established at a temperature of 23° C. and a pressure of 1013.25 hPa has been reached. Employed as an indicator for reaching the abovementioned equilibrium is the total cycles content determined by gas chromatography and defined as the sum of the $D_4$-, $D_5$-, $D_6$-contents based on the siloxane matrix and ascertained after derivatization of the α,ω-diacetoxypolydimethylsiloxanes to the corresponding diisopropoxypolydimethylsiloxanes. The derivatization to afford the diisopropoxypolydimethylsiloxanes is intentionally chosen in order to prevent a thermally induced retrocleavage reaction of the α☐ω-diacetoxypolydimethylsiloxanes which may take place under the conditions of analysis by gas chromatography (regarding the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, $4^{th}$ Edition, O-Metal Derivates of Organic Hydroxy Compounds p. 162 ff)). According to the invention the total cycles content present therein defined as the sum of the content fractions of the cyclic siloxanes comprising $D_4$, $D_5$ and $D_6$ based on the siloxane matrix shall preferably be less than 13 percent by weight, particularly preferably less than 12 percent by weight, α,ω-based on the siloxane matrix consisting of α,ω-diisopropoxypolydimethylsiloxanes.

Equilibrated α,ω-diacetoxypolydimethylsiloxanes of this quality, i.e. end-equilibrated α,ω-diacetoxypolydimethylsiloxanes, may be produced very advantageously, i.e. even after a very short reaction time, by reaction of siloxane cycles (particularly comprising $D_4$ and/or $D_5$) with acetic anhydride in the presence of trifluoromethanesulfonic acid and acetic acid. It is preferable when acetic acid is added in amounts of 0.4 to 3.5 percent by weight, preferably 0.5 to 3 percent by weight, more preferably 0.8 to 1.8 percent by weight, particularly preferably in amounts of 1.0 to 1.5 percent by weight, based on the reaction matrix consisting of acetic anhydride and cyclic siloxanes.

The provision of trifluoromethanesulfonic acid-acidified, end-equilibrated α☐ω-diacetoxypolydimethylsiloxanes employable according to the invention is described by way of example in example 1 of the present invention.

The inventors have found that incompletely equilibrated α,ω-diacetoxypolydimethylsiloxanes result in unusable product mixtures, in particular in terms of the degree of polymerization achieved therein.

Since the degree of polymerization of the linear polydimethylsiloxane-polyoxyalkylene block copolymers is quality-determining, in particular for its effectiveness as a surfactant in polyurethane ether foams, reaction monitoring plays an important role. What has proven useful in this regard is the method of withdrawing over the course of the reaction time samples of the reaction matrix which are then analyzed for example using $^{29}$Si-NMR and/or $^{13}$C-NMR spectroscopy. The reduction in the integral of the signals characteristic of the presence of acetoxydimethylsiloxy groups —OSi(CH$_3$)$_2$OCOCH$_3$ accompanies the intended molar mass increase of the copolymer having an A(BA)n structure and is a reliable indicator of the reaction conversion achieved.

Obtained in this way in a manner unforeseeable to those skilled in the art are structures which as stabilizers in the production of polyurethane foams (PU foams), in particular flexible PU foams, exhibit markedly better properties.

The invention accordingly provides a process for producing SiOC-bonded, linear polydimethylsiloxane-polyoxyalkylene block copolymers comprising repeating (AB) units by reaction of polyether diols with trifluoromethanesulfonic acid-acidified, end-equilibrated α,ω-diacetoxypolydimethylsiloxanes, wherein the reaction is undertaken by adding a solid, liquid or gaseous base, optionally using inert solvents.

Inert solvents employed in a preferred embodiment of the invention are alkanes, cycloalkanes, alkylaromatics, end-capped polyethers and/or emollient esters, such as the esters derived from lauric acid, myristic acid, palmitic acid, stearic acid, oleic acid, isostearic acid, ricinoleic acid and behenic acid combined with cetyl, stearyl, isostearyl, oleyl, octyldodecyl, myristyl and behenyl alcohol or glycerol, preferably myristyl myristate.

The invention further provides SiOC-bonded linear polydimethylsiloxane-polyoxyalkylene block copolymers produced by the above process.

The invention further provides for the use of the compounds produced by the process according to the invention as surface-active additives for producing polyurethane ether foams.

Further aspects of the invention are characterized by the claims.

In a preferred embodiment of the invention the siloxane blocks (A) of the block copolymers are linear siloxane polymers or chains comprising repeating siloxane units which may be represented by the formula (—R$_2$SiO—), wherein R=methyl.

In a preferred embodiment of the invention the polyoxyalkylene block (B) of the linear block copolymers is an oxyalkylene polymer containing the repeating oxyalkylene units, here in particular the oxyethylene and propenyloxy units.

In a preferred embodiment the weight-average molecular weight of each siloxane block (A) is between 650 to 6500 g/mol, preferably 800 to 1500 g/mol, particularly preferably 1000 to 1200 g/mol.

In a preferred embodiment the weight-average molecular weight of each polyoxyalkylene block of the copolymers produced according to the invention is between 600 and 10 000 g/mol, preferably 1000 to 5000 g/mol.

The size of the individual oxyalkylene units or siloxane blocks is not necessarily uniform but may vary as desired within the specified limits.

In a preferred embodiment of the invention the individual polyoxyalkylene units are addition products of at least one oxyalkylene monomer selected from the group of ethylene oxide, propylene oxide, butylene oxide, tetrahydrofuran, preferably mixed products composed of at least two monomer units, in particular of ethylene oxide and propylene oxide.

In a preferred embodiment the polyoxyalkylene blocks consist essentially of oxyethylene units or oxypropylene units, preference being given to mixed oxyethylene and oxypropylene units having an oxyethylene proportion of 30 to 70 percent by weight and an oxypropylene proportion of 70 to 30 percent by weight based on the total content of oxyalkylene units in the block.

In a preferred embodiment the total siloxane block proportion (A) in the copolymer is between 20 and 50 percent by weight, preferably 25% to 40% by weight, and the proportion of the polyoxyalkylene blocks is between 80% and 50% by weight. In a preferred embodiment the block copolymer has an average weight-average molecular weight Mw of at least 10 000 g/mol to about 160 000 g/mol, preferably 15 000 g/mol to about 100 000 g/mol, in particular 20 000 g/mol to about 36 000 g/mol. Determination of these average molecular weights is based on the known methods of GPC analysis.

In a preferred embodiment the molar ratio of α,ω-diacetoxysiloxanes to polyether diols is in the range from 0.90 to 1.10, preferably in the range 0.95 to 1.05, particularly preferably in the range 0.99 to 1.01. It is readily apparent to those skilled in the art that the achievable degree of polymerization depends on achieving a virtually perfect stoichiometry of the reactants.

In a preferred embodiment the process according to the invention is implemented by reaction of end-equilibrated, acetoxy-Si-containing polyorganosiloxanes of general formula (II)

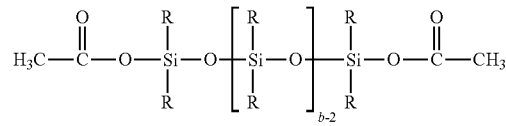

wherein:
R represents methyl radicals,
b represents 8 to 80, preferably 10 to 50, particularly preferably 10 to 25, with at least one alcohol selected from the group of polyether diols of general formula (III)

wherein
R$^1$ represents methyl
n represents 2 to 4,
m represents 0 or 1
x represents a value of 1 to 200, preferably 10 to 100, in particular 35 to 60, wherein the oxyalkylene segments —(C$_n$H$_{(2n-m)}$R$^1$$_m$O—) within an oxyalkylene ether radical may differ from one another and the sequence of the individual segments —(C$_n$H$_{(2n-m)}$R$^1$$_m$O—) is freely choosable and in particular comprises block copolymers, random polymers and combinations thereof.

Preferred according to the invention are polyether diols containing ethylene oxide (EO) and propylene oxide (PO) as copolymers. Particular preference is given to EO/PO copolymers having a block-type construction and containing an EO proportion of about 30% to 70% by weight based on the total content of oxyalkylene units.

To ensure elevated storage stability the linear SiOC-bonded polyether siloxanes produced by the process according to the invention may additionally be admixed with small amounts of organic amines, for example N-methylmorpholine, triisopropanolamine or triethanolamine. This corresponds to a preferred embodiment of the invention.

A particularly sensitive and informative assessment of the compounds according to the invention is possible using a performance test in which the obtained copolymer is introduced as a foam stabilizer into polyurethane formulations for producing in particular ether foams or open-celled rigid foams. Structural deficits in the foam stabilizer manifest during foaming as technical inadequacies, for example shrinkage or collapse.

Production of the SiOC-bonded, linear polydimethylsiloxane-polyoxyalkylene block copolymers claimed by the process according to the invention may be carried out with or without use of a suitable solvent as desired. If high molecular weight and thus high-viscosity SiOC-bonded copolymers are sought the production thereof for ease of handling during and after synthesis may advantageously be carried out by reaction of the respective polyether diol with the respective $\alpha,\omega$-acetoxysiloxane in a suitable solvent. Suitable solvents are alkanes, cycloalkanes, alkylaromatics, end-capped polyethers but also emollient esters such as myristyl myristate or the like, high-boiling solvents having boiling points >120° C. being preferred in particular.

It has been found according to the invention that swift and complete conversion of trifluoromethanesulfonic acid-acidified, equilibrated $\alpha\square\omega$-diacetoxypolydimethylsiloxanes with polyether diols while avoiding discoloration of the reaction product is achieved in the presence of bases such as for example ammonia. The use of ammonia corresponds to a particularly preferred embodiment of the invention.

According to the invention the amount of the solid, liquid or gaseous base introduced into the reaction system is preferably measured such that it is sufficient not only for the neutralization of the trifluoromethanesulfonic acid present in the system but also for the salt precipitation of the acetate groups bonded to the siloxane and the precipitation of the acetic anhydride and any free acetic acid still present in the reaction system. In a preferred embodiment of the invention the reaction is preferably performed at temperatures between 20° C. and 70° C. over a duration of preferably 1 to 3 hours.

In another embodiment preferred according to the invention base(s) are initially charged with stirring into the polyetherol or, respectively, polyetherol mixture provided for bonding even before the trifluoromethanesulfonic acid-acidified, equilibrated $\alpha\square\omega$-diacetoxypolydimethyl siloxane is added.

In a preferred embodiment of the invention this reaction is performed preferably at temperatures between 50° C. to 90° C. and preferably over a duration of 2 to 6 hours.

Preferred simple bases to be employed according to the invention are for example alkali metal and/or alkaline earth metal carbonates and/or hydrogencarbonates and/or gaseous ammonia and/or amines. Having regard to the known propensity for condensation of acetoxysiloxanes, very particular preference is given to bases which on account of their chemical composition do not introduce any water into the reaction system. Thus anhydrous carbonates are preferred over hydrogencarbonates and bases free from water of hydration are preferred over bases containing water of hydration.

It has moreover been found that, surprisingly, the polyether siloxanes produced according to the invention have an excellent storage stability. As a criterion for assessing the storage stability of the SiOC-bonded polyether siloxanes produced in accordance with the inventive teaching, viscosity is monitored as a function of time at a constant storage temperature by sampling since any possible degradation and/or growth processes sensitively manifest therein.

In a preferred embodiment the reaction temperature for producing the copolymers according to the invention should be at 20° C. to 120° C., preferably at 20° C. to 70° C.

EXAMPLES

The examples which follow are provided merely to elucidate this invention to those skilled in the art and do not constitute any limitation of the claimed process whatsoever. The inventive determination of the water contents is in principle performed by the Karl Fischer method based on DIN 51777, DGF E-III 10 and DGF C-III 13a. $^{29}$Si-NMR spectroscopy was used for reaction monitoring in all examples.

In the context of the present invention the $^{29}$Si NMR samples are analysed at a measurement frequency of 79.49 MHz in a Bruker Avance III spectrometer equipped with a 287430 sample head with gap width of 10 mm, dissolved at 22° C. in CDCl$_3$ and against a tetramethylsilane (TMS) external standard [$\delta(^{29}$Si$)=0.0$ ppm].

The gas chromatograms are recorded on an Agilent Technologies GC 7890B GC instrument fitted with an HP-1 column having dimensions of 30 m×0.32 mm ID×0.25 µm dF (Agilent Technologies No. 19091Z-413E) using hydrogen as a carrier gas and employing the following parameters:

Detector: FID; 310° C.
Injector: Split; 290° C.
Mode: constant flow, 2 ml/min
Temperature program: 60° C. at 8° C./min–150° C. at 40° C./min–300° C. 10 min.

Employed as an indicator for reaching the equilibrium is the total cycles content determined by gas chromatography and defined as the sum of the D4-, D5-, D6-contents based on the siloxane matrix and ascertained after derivatization of the $\alpha,\omega$-diacetoxypolydimethylsiloxanes to the corresponding $\alpha,\omega$-diisopropoxypolydimethylsiloxanes. The derivatization to afford the $\alpha\square\omega$-diisopropoxypolydimethylsiloxanes is intentionally chosen in order to prevent a thermally induced retrocleavage reaction of the $\alpha,\omega$-diacetoxypolydimethylsiloxanes which may take place under the conditions of analysis by gas chromatography (regarding the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, O-Metal Derivates of Organic Hydroxy Compounds p. 162 ff)).

The employed polyether diols have water contents of about 0.2 mass % and are used without further pre-drying. Employed toluene and, respectively, alkylbenzene (C$_{10}$-C$_{13}$) have a water content of 0.03 mass % and are likewise used without pre-drying.

The OH number of the polyether diols is determined according to DGF C-V 17 a (53) or according to Ph. Eur. 2.5.3 Method A, wherein this comprises initially acetylating the hydroxyl groups of the sample for analysis with acetic anhydride in the presence of pyridine and subsequently in the context of a differential titration (blank sample, accounting for acetic anhydride excess) titrating the liberated acetic acid as the consumption of KOH in mg per gram of polyether diol.

Example 1

Production of an end-equilibrated, acetoxy-terminated, linear polydimethylsiloxane In a 1000 ml four-necked flask fitted with a KPG stirrer, internal thermometer and a reflux cooler 77.3 g (0.757 mol) of acetic anhydride together with 732.8 g (1.98 mol) of decamethylcyclopentasiloxane (D5) and 24.3 g of acetic acid (3.0 percent by weight based on the total mass of the reactants) are initially charged with stirring and admixed with 1.62 g (0.88 ml) of trifluoromethanesulfonic acid (0.2 percent by mass based on the total batch) and swiftly heated to 150° C. The initially slightly cloudy reaction mixture is held at this temperature for 4 hours with continued stirring.

After cooling of the batch a colourless, clear, mobile liquid is isolated, whose $^{29}$Si-NMR spectrum demonstrates the presence of Si-acetoxy groups in a yield of about 93% based on employed acetic anhydride corresponding to an α,ω-diacetoxypolydimethylsiloxane having an average total chain length of about 14.

Conversion of the α,ω-diacetoxypolydimethylsiloxane into the corresponding α,ω-diisopropoxypolydimethylsiloxane for analytical characterization Immediately after the synthesis, in a 250 ml four-necked flask fitted with a KPG stirrer, internal thermometer and a reflux cooler 50.0 g of this trifluoromethanesulfonic acid-acidified, equilibrated α,ω-diacetoxypolydimethylsiloxane is mixed together with 11.3 g of a molecular sieve-dried isopropanol by stirring at 22° C. Gaseous ammonia (NH$_3$) is introduced to the reaction mixture until alkaline reaction (moist universal indicator paper) and the mixture is then stirred at this temperature for a further 45 minutes. The precipitated salts are separated using a pleated filter. A colourless, clear, mobile liquid is isolated, whose accompanying $^{29}$Si-NMR spectrum demonstrates the quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analyzed by gas chromatography. The gas chromatogram shows the following contents (reported in percent by mass):

| $D_4$ | $D_5$ | $D_6$ | Total ($D_4 - D_6$) | Isopropanol content |
|---|---|---|---|---|
| 4.09% | 2.62% | 0.86% | 7.57% | 4.60% |

Example 2 (Inventive)

Initially charged with stirring into a a 250 ml four-necked flask fitted with a KPG stirrer, contact thermometer, a reflux cooler and a gas feed tube are 0.02 mol (36.2 g) of the linear, trifluoromethanesulfonic acid-acidified α,ω-acetoxysiloxane N=14 produced in example 1 together with 0.02 mol (56.1 g) of a polyether diol (ethylene oxide-propylene oxide copolymer having a molar mass determined by OH number of about 2805 g/mol and a propylene oxide proportion of about 50 percent by weight) and 92.3 g of toluene.

Introduced into this homogeneously clear mixture at room temperature with further stirring over 45 min is a moderate stream of dry ammonia gas. Without introduction of further ammonia the reaction mixture which is markedly more viscous even at this juncture is then heated to 70° C. for 3 hours.

The batch is allowed to cool to about 23° C. and the viscous copolymer dissolved in toluene is freed from the salts present therein using a filter press. A colorless, clear filtrate is isolated. Toluene is distilled off at reduced pressure (0.1 mbar) using a rotary evaporator.

The accompanying GPC shows an Mw=108977 g/mol and an Mn=44726 g/mol.

The invention claimed is:

1. A SiOC-bonded, linear polydimethylsiloxane-polyoxyalkylene block copolymer, comprising repeating (AB) units produced by a process for producing SiOC-bonded, linear polydimethylsiloxane-polyoxyalkylene block copolymers comprising repeating (AB) units by reaction of polyether diols with trifluoromethanesulfonic acid-acidified, end-equilibrated α,ω-diacetoxypolydimethylsiloxanes, wherein the reaction is undertaken by adding a solid, liquid or gaseous base, in the presence of one or more inert solvents, wherein the proportion of the siloxane blocks A in the total copolymer is between 25 and 50 percent by weight, wherein said end equilibrated α,ω-diacetoxypolydimethylsiloxanes has a sum of a content fractions of cyclic siloxanes comprising $D_4$, $D_5$ and $D_6$ of less than 13 percent by weight.

2. The SiOC-bonded, linear polydimethylsiloxane-polyoxyalkylene block copolymer according to claim 1, wherein the molar ratio of trifluoromethanesulfonic acid-acidified, end-equilibrated α,ω-diacetoxypolydimethylsiloxanes to polyether diols is in the range from 0.90 to 1.10.

3. The SiOC-bonded, linear polydimethylsiloxane-polyoxyalkylene block copolymer according to claim 2, wherein the base is selected from the group consisting of alkali metal and/or alkaline earth metal carbonates and/or hydrogencarbonates, and/or amines.

4. The SiOC-bonded, linear polydimethylsiloxane-polyoxyalkylene block copolymer according to claim 1, wherein the reaction is performed at temperatures of from 20° C. to 120° C.

5. The SiOC-bonded, linear polydimethylsiloxane-polyoxyalkylene block copolymer according to claim 1, wherein the bases are selected from the group consisting of alkali metal and/or alkaline earth metal carbonates and/or hydrogencarbonates and/or amines.

6. The SiOC-bonded, linear polydimethylsiloxane-polyoxyalkylene block copolymer according to claim 1, wherein inert solvents are selected from the group consisting of alkanes, cycloalkanes, alkylaromatics, end-capped polyethers and/or emollient esters, the esters derived from lauric acid, myristic acid, palmitic acid, stearic acid, oleic acid, isostearic acid, ricinoleic acid and behenic acid combined with cetyl, stearyl, isostearyl, oleyl, octyldodecyl, myristyl and behenyl alcohol or glycerol.

7. The SiOC-bonded, linear polydimethylsiloxane-polyoxyalkylene block copolymer according to claim 1, wherein the weight-average molecular weight of each siloxane block (A), $(-(CH_3)_2SiO-)_b$, is between 600 and 6100 g/mol.

8. The SiOC-bonded, linear polydimethylsiloxane-polyoxyalkylene block copolymer according to claim 1, wherein the polyoxyalkylene block (B), $(-C_nH_{(2n-1)}R^1_mO-)_c$, wherein $R^1$ represents methyl, contains mixed oxyethylene and oxypropylene units having an oxyethylene proportion of from 30 to 70 percent by weight and an oxypropylene proportion of from 70 to 30 percent by weight based on the total content of oxyalkylene units in the block.

9. The SiOC-bonded, linear polydimethylsiloxane-polyoxyalkylene block copolymer according to claim 1, wherein the weight-average molecular weight of each polyoxyalkylene block (B), $(C_nH_{(2n-1)}R^1_mO)_c$, wherein $R^1$ represents methyl, is between 600 and 10 000 g/mol.

10. The SiOC-bonded, linear polydimethylsiloxane-polyoxyalkylene block copolymer according to claim 1, wherein the proportion of the siloxane blocks A in the total copolymer is between 20 and 50, percent by weight.

11. The SiOC-bonded, linear polydimethylsiloxane-polyoxyalkylene block copolymer according to claim 1, wherein the polydimethylsiloxane-polyoxyalkylene block copolymer has a weight-average molecular weight of 10 000 g/mol to 200 000 g/mol.

12. The SiOC-bonded, linear polydimethylsiloxane-polyoxyalkylene block copolymer according to claim 1, wherein the molar ratio of trifluoromethanesulfonic acid-acidified, end-equilibrated α,ω-diacetoxypolydimethylsiloxanes to polyether diols is in the range from 0.95 to 1.05.

13. The SiOC-bonded, linear polydimethylsiloxane-polyoxyalkylene block copolymer according to claim 1, wherein the reaction is performed at temperatures of from 20° C. to 70° C.

14. The SiOC-bonded, linear polydimethylsiloxane-polyoxyalkylene block copolymer according to claim 1, wherein the base is gaseous ammonia.

15. The SiOC-bonded, linear polydimethylsiloxane-polyoxyalkylene block copolymer according to claim 1, wherein the inert solvent is myristyl myristate.

16. The SiOC-bonded, linear polydimethylsiloxane-polyoxyalkylene block copolymer according to claim 1, wherein the proportion of the siloxane blocks A in the total copolymer is between 25 and 40 percent by weight.

17. The SiOC-bonded, linear polydimethylsiloxane-polyoxyalkylene block copolymer according to claim 1, wherein the polydimethylsiloxane-polyoxyalkylene block copolymer has a weight-average molecular weight of 25,000 g/mol to 180,000 g/mol.

18. The SiOC-bonded, linear polydimethylsiloxane-polyoxyalkylene block copolymer according to claim 1, wherein the polydimethylsiloxane-polyoxyalkylene block copolymer has a weight-average molecular weight of 40,000 g/mol to 140,000 g/mol.

19. A surface-active additive for producing polyurethane ether foam, the surface-active additive comprising the SiOC-bonded, linear polydimethylsiloxane-polyoxyalkylene block copolymers according to claim 1.

20. The SiOC-bonded, linear polydimethylsiloxane-polyoxyalkylene block copolymer according to claim 1, wherein said end-equilibrated $\alpha,\omega$-diacetoxypolydimethylsiloxanes has a sum of a content fractions of cyclic siloxanes comprising $D_4$, $D_5$ and $D_6$ of less than 12 percent by weight.

21. The SiOC-bonded, linear polydimethylsiloxane-polyoxyalkylene block copolymer according to claim 1, wherein said end-equilibrated $\alpha,\omega$-diacetoxypolydimethylsiloxanes has a sum of a content fractions of cyclic siloxanes comprising $D_4$, $D_5$ and $D_6$ of 7.57 percent by weight or less.

* * * * *